United States Patent
Kadoshima et al.

(10) Patent No.: US 6,885,626 B2
(45) Date of Patent: Apr. 26, 2005

(54) INFORMATION RECORDING/ REPRODUCING APPARATUS

(75) Inventors: Tetsuo Kadoshima, Saitama-ken (JP); Michio Fujita, Saitama-ken (JP); Yoshihiro Aso, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 505 days.

(21) Appl. No.: 10/157,125

(22) Filed: May 30, 2002

(65) Prior Publication Data

US 2002/0181359 A1 Dec. 5, 2002

(30) Foreign Application Priority Data

May 31, 2001 (JP) ....................................... 2001-164910

(51) Int. Cl.[7] .............................. G11B 7/00; G11B 5/09
(52) U.S. Cl. .................. 369/124.06; 369/84; 369/59.14
(58) Field of Search ....................... 369/124.06, 124.04, 369/124.09, 83, 84, 47.19, 47.2, 47.23, 47.24, 53.31; 386/52, 56, 109, 112

(56) References Cited

U.S. PATENT DOCUMENTS

| 5,654,946 | A | | 8/1997 | Kim et al. |
| 5,802,240 | A | * | 9/1998 | Asai ............................ 386/52 |
| 6,205,104 | B1 | * | 3/2001 | Nagashima et al. ..... 369/59.14 |
| 6,567,470 | B1 | * | 5/2003 | Hirosawa ................ 375/240.25 |
| 6,683,911 | B1 | * | 1/2004 | Inoue ...................... 375/240.26 |

FOREIGN PATENT DOCUMENTS

| EP | 1 001 420 A1 | 5/2000 |
| EP | 1 073 052 A2 | 1/2001 |

* cited by examiner

*Primary Examiner*—Thang V. Tran
(74) *Attorney, Agent, or Firm*—Arent Fox

(57) ABSTRACT

An information recording/reproducing apparatus which allows freer utilization of data compressed under different data compression schemes. When data recorded on a magneto-optical disc of an MD under the ATRAC compression scheme is converted into that of the ATRAC3 compression scheme and re-recorded on the magneto-optical disc, selector switches are changed over in a predetermined combination. The data recorded under the ATRAC compression scheme is read and demodulated by a signal processing unit. The demodulation data is decoded into linear PCM data by a data expansion decoder. The linear PCM data is converted into data of the ATRAC3 compression scheme by a data compression encoder. The resultant is modulated by the signal processing unit and re-recorded on the magneto-optical disc. Here, the track numbers of the data originally recorded under the ATRAC compression scheme are kept unchanged, and associated with the data which is converted and recorded under the ATRAC3 compression scheme. UTOC data thereof is recorded on the MD.

10 Claims, 12 Drawing Sheets

Fig.3

| | SWA1 | SWA2 | SWB1 | SWB2 | SWC1 | SWC2 | |
|---|---|---|---|---|---|---|---|
| RECORDING MODE (1) | a11 · a12 | a21 · a22 | OFF | OFF | OFF | OFF | |
| RECORDING MODE (2) | a11 · a13 | a21 · a23 | OFF | OFF | OFF | OFF | |
| REPRODUCTION MODE (1) | OFF | OFF | b11 · b12 | b21 · b22 | OFF | OFF | IN DATA REPRODUCTION UNDER ATRAC COMPRESSION SCHEME |
| | OFF | OFF | b11 · b13 | b21 · b23 | OFF | OFF | IN DATA REPRODUCTION UNDER ATRAC3 COMPRESSION SCHEME |
| REPRODUCTION MODE (2) | OFF | OFF | b11 · b12 | b21 · b22 | OFF | OFF | WHEN INSTRUCTION IS GIVEN FOR DATA REPRODUCTION UNDER ATRAC COMPRESSION SCHEME |
| | OFF | OFF | b11 · b13 | b21 · b23 | OFF | OFF | WHEN INSTRUCTION IS GIVEN FOR DATA REPRODUCTION UNDER ATRAC3 COMPRESSION SCHEME |
| COMPRESSION RATE CHANGE MODE (1) | OFF | OFF | OFF | OFF | ON | OFF | |
| COMPRESSION RATE CHANGE MODE (2) | OFF | OFF | OFF | OFF | OFF | ON | |

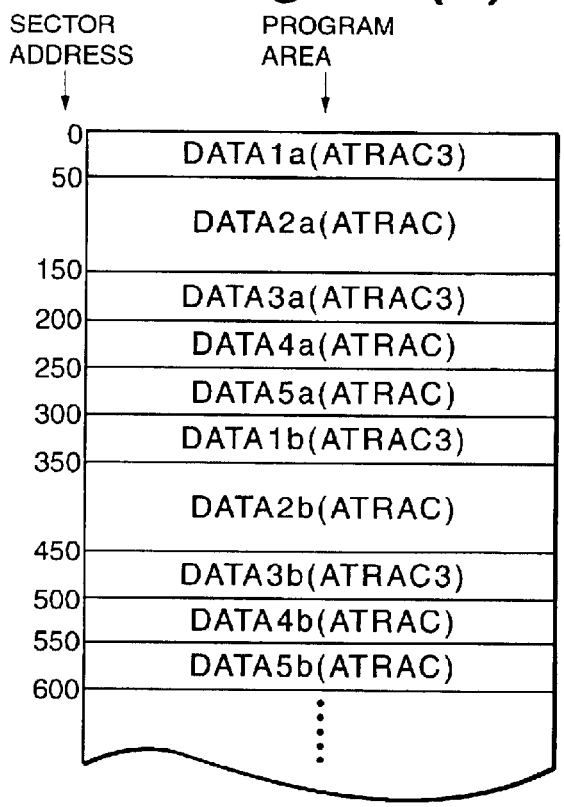
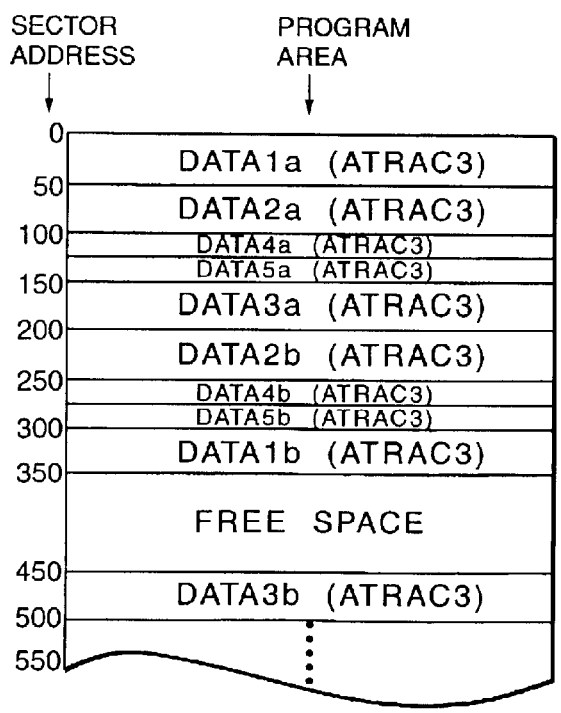

INFORMATION RECORDING/REPRODUCING APPARATUS

BACKGROUND OF THE INVENTION

1. Field of the Invention

The invention relates to an information recording/reproducing apparatus having a facility to compress data recorded on an information recording/reproducing medium such as an MD (Mini Disc) and record the resultant on the original information recording/reproducing medium.

The present application claims priority from Japanese Application No. 2001-164910, the disclosure of which is incorporated herein by reference for all purposes.

2. Description of the Related Art

With the progression of data compression recording technologies, it has become possible to record data such as music on an information recording/reproducing medium such as an MD in higher densities and larger amounts.

Under circumstances where various data compression recording technologies are being developed, however, users have suffered inconvenience. For example, if users having an MD or the like which contains data of an earlier data compression scheme wish to convert the data to a recent data compression scheme and record it on an MD or the like again, it has been necessary to prepare both an information reproducing apparatus such as an MD player which uses the earlier data compression scheme and an information recording apparatus such as an MD recorder which uses the recent data compression scheme.

More specifically, it has been required to take steps such that the MD player or the like using the earlier data compression scheme and the MD recorder or the like using the recent data compression scheme are connected to each other, and the MD player or the like reproduces the data of the earlier data compression scheme recorded on the MD or the like while the MD recorder or the like compresses the reproduced data under the recent compression scheme and dubs the resultant on another MD or the like.

That is, aside from such problems as the necessity for the MD player, MD recorder, etc., there has been a need for so-called dubbing. This need for dubbing has prevented the data converted to the recent data compression scheme from being re-recorded on the original MD or the like. Consequently, there have been restraints on flexibility such as difficulties in data editing and MD management, with the result of inconvenience.

Moreover, the dubbing onto another MD or the like has been necessary not only for situations where data recorded under earlier data compression schemes is converted and recorded under recent data compression schemes, but also for situations where data recorded under recent data compression schemes is converted and recorded under earlier data compression schemes. This has also caused the restrictions on flexibility, with the result of inconvenience.

SUMMARY OF THE INVENTION

The present invention has been achieved in view of the foregoing conventional problems. It is thus an object of the present invention to provide an information recording/reproducing apparatus which allows freer utilization of data compressed under different data compression schemes.

In order to achieve the foregoing object, the present invention provides an information recording/reproducing apparatus comprising: reading means for reading data recorded on an information recording/reproducing medium, the data being compressed under a predetermined data compression scheme; decoding means for decoding the data read by the reading means; encoding means for compressing the data decoded by the decoding means under a data compression scheme other than the data compression scheme; and writing means for writing the data compressed by the encoding means on the information recording/reproducing medium.

According to the information recording/reproducing apparatus of such configuration, data which is recorded on an information recording/reproducing medium as compressed under a predetermined data compression scheme is compressed under a different data compression scheme and re-recorded on the information recording/reproducing medium.

This information recording/reproducing apparatus thus converts data into that of a different data compression scheme and re-records it on the original information recording/reproducing medium by itself.

The foregoing information recording/reproducing apparatus further comprises control means for generating management data and making the writing means record the generated management data on the information recording/reproducing medium, wherein the management data manages the data written by the writing means as a same type of data as the data read by the reading means.

According to the information recording/reproducing apparatus of such configuration, the management data for managing the data written after data conversion as the same type of data as that before the data conversion is recorded on the information recording/reproducing medium.

This allows the data written after the data conversion to be treated as the same type of data as that before the data conversion, thereby achieving enhanced convenience and the like.

In the foregoing information recording/reproducing apparatus, if trouble occurs while the writing means record the data compressed by the encoding means on the information recording/reproducing medium, the control means retain information on a final read position of the data already read by the reading means and information on a final write position of the data already written by the writing means. When the trouble disappears, the control means make the reading means resume reading from data recorded between the final read position and the final write position, make the decoding means and the encoding means perform their processing, and make the writing means write data compressed after the resumption in succession to the data already written before the occurrence of the trouble.

According to the information recording/reproducing apparatus of such configuration, even if trouble occurs, both the data already written before the occurrence of the trouble and the data written after the resumption of data read are properly converted and recorded on the information recording/reproducing medium.

In the foregoing information recording/reproducing apparatus, the control means generate management data and make the writing means record the generated management data on the information recording/reproducing medium, the management data managing the data written before the occurrence of the trouble and the data written after the resumption as separate pieces of data.

According to the information recording/reproducing apparatus of such configuration, the data written before the occurrence of the trouble and the data written after the resumption of the data read can be managed as separate pieces of data. This allows various modes of management corresponding to the occurrence of trouble.

In the foregoing information recording/reproducing apparatus, the control means generate management data and make the writing means record the generated management data on the information recording/reproducing medium, the management data managing the data written before the occurrence of the trouble and the data written after the resumption as the same type of data.

According to the information recording/reproducing apparatus of such configuration, the data written before the occurrence of the trouble and the data written after the resumption of the data read can be managed as the same type of data. Consequently, the data can be managed as if no trouble occurred.

BRIEF DESCRIPTION OF THE DRAWINGS

These and other objects and advantages of the present invention will become clear from the following description with reference to the accompanying drawings, wherein:

FIG. 3 is a chart showing the operation modes of the selector switches arranged in the information recording/reproducing apparatus of the present embodiment;

FIGS. 10(a) and 10(b) are diagrams illustrating still another recording mode of data recorded on an MD in the compression rate change mode (1);

FIGS. 11(a) and 11(b) are diagrams illustrating the recording mode for situations where the data shown in FIG. 10(a) is compressed under a different data compression scheme and recorded on the MD;

DETAILED DESCRIPTION OF THE PREFERRED EMBODIMENTS

Now, an embodiment of the present invention will be described below with reference to the drawings. Here, a recordable MD (Mini Disc) player which uses a recordable MD for data recording and reproduction will be described as the information recording/reproducing apparatus of the present embodiment.

Figure 1:
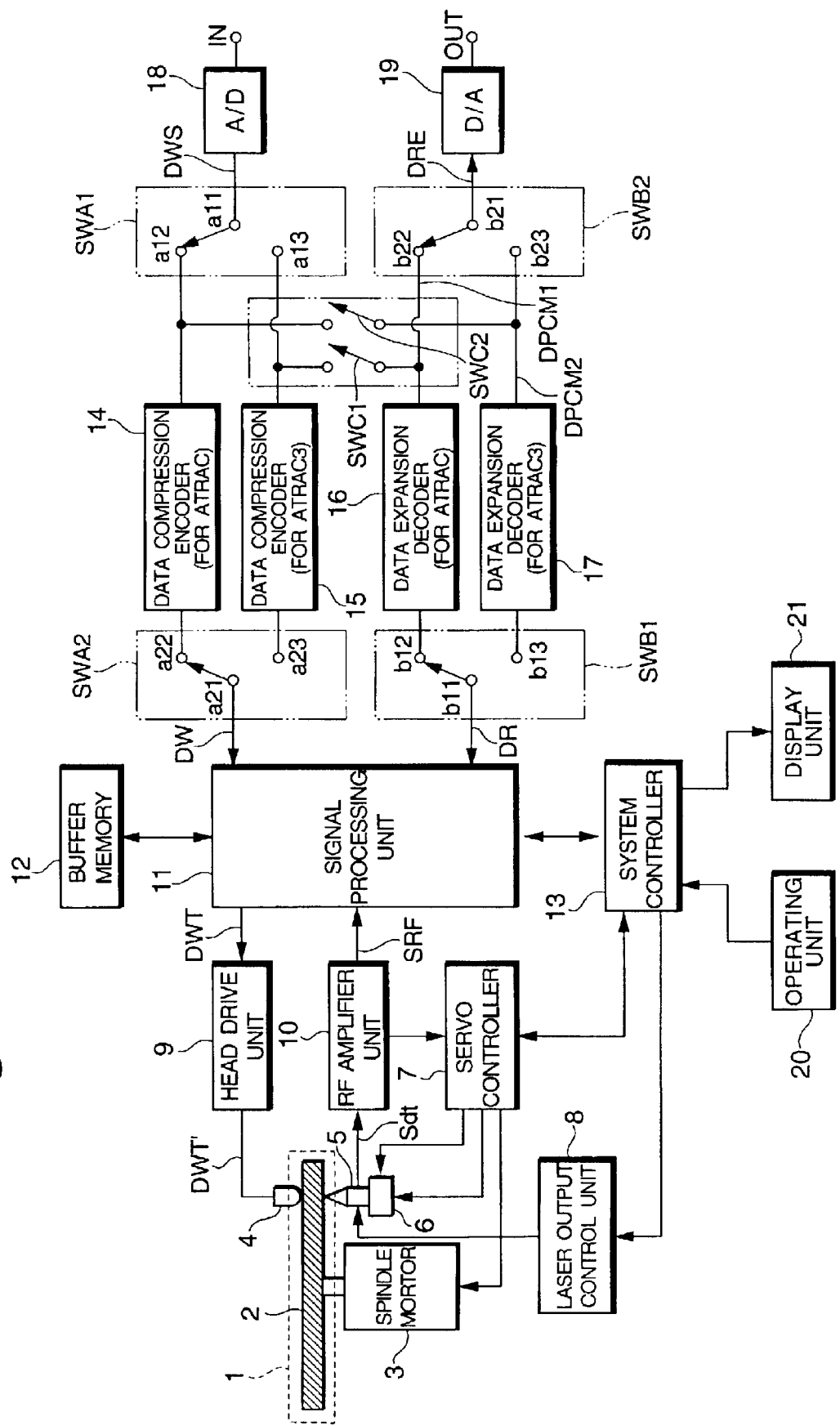
FIG. 1 is a block diagram showing the configuration of a recordable MD player according to an embodiment.

FIG. 1 is a block diagram showing the configuration of the recordable MD player of the present embodiment.

In the diagram, this recordable MD player has a spindle motor 3, a magnetic head 4, an optical pickup 5, and a carriage 6. The optical pickup 5 contains a semiconductor laser (not shown). The carriage 6 carries and moves the magnetic head 4 and the optical pickup 5.

When a recordable MD is loaded in a so-called clamp position, the spindle motor 3 rotates a magneto-optical disc 2 contained in the MD cartridge 1 at a predetermined linear velocity according to the instruction from a system controller 13 to be described later. The magnetic head 4 and the optical pickup 5, opposed to the recording surface of the magneto-optical disc 2, write data onto the recording surface or read data recorded on the recording surface.

More specifically, in data write, the optical pickup 5 irradiates the recording surface of the magneto-optical disc 2 with a laser beam while the magnetic head 4 applies a recording field thereto. Data write is thus effected by magneto-optical recording.

In data read, the optical pickup 5 irradiates the recording surface of the magneto-optical disc 2 with a laser beam from its semiconductor laser. Optical elements (not shown) arranged in the optical pickup 5, such as an analyzer and a photoreceptor, detect the direction of polarization of the beam reflected from the recording surface, and output a detection signal Sdt thereof.

In both data write and data read, the carriage 6 shifts to move the magnetic head 4 and the optical pickup 5 along the radial direction of the magneto-optical disc 2, thereby allowing random access to the recording surface.

This recordable MD player also has a servo controller 7, a laser output control unit 8, a head drive unit 9, an RF amplifier unit 10, a signal processing unit 11, a buffer memory 12, and a system controller 13. Additionally, the recordable MD player includes a plurality of data compression encoders 14 and 15, a plurality of data expansion decoders 16 and 17, a plurality of selector switches SWA1, SWA2, SWB1, SWB2, SWC1, and SWC2, an A/D converter 18, and a D/A converter 19.

The servo controller 7 exercises synchronous servo control over the spindle motor 3 so that the magneto-optical disc 2 is maintained at a constant linear velocity. The servo controller 7 also controls the movement of the carriage 6.

In addition, the servo controller 7 exercises focus servo control and tracking servo control on actuators (not shown) to fine-adjust the position of the optical pickup 5. The optical pickup 5 is thereby adjusted in position with respect to the recording surface of the magneto-optical disc 2 so that data write and data read are effected appropriately.

The laser output control unit 8 controls the emission power of the semiconductor laser arranged in the optical pickup 5 so that the recording surface of the magneto-optical disc 2 is irradiated with laser beams of appropriate intensities during data write and data read.

In data write, the head drive unit 9 supplies writing data DWT' to the magnetic head 4, thereby producing the recording field for magneto-optical recording.

The RF amplifier unit 10 generates error signals such as a focus error signal and a tracking error signal from the detection signal Sdt output from the optical pickup 5. The RF amplifier unit 10 also generates an RF (Radio Frequency) signal SRF which contains data recorded on the recording surface of the magneto-optical disc 2. The error signals are supplied to the servo controller 7. The RF signal SRF is supplied to the signal processing unit 11.

In data read, the signal processing unit 11 subjects the supplied RF signal SRF to A/D conversion, followed by EFM (Eight to Fourteen Modulation) demodulation and such decoding conformable to a predetermined specification as deinterleaving, to generate demodulation data DR.

Then, the signal processing unit 11 stores the generated demodulation data DR into the buffer memory 12 by a predetermined amount and, each time a predetermined amount of data is stored, reads and outputs the same to the selector switch SWB1 at predetermined timing. The signal processing unit 11 repeats the foregoing processing. Consequently, the demodulation data DR is temporarily stored in the buffer memory 12 in units of predetermined amounts and read therefrom for the sake of adjustment between the timing to read data from the magneto-optical disc 2 and the timing for the signal processing unit 11 to perform decoding.

The signal processing unit 11, when supplied with recording data DW through the selector switch SWA2 in data write, applies EFM modulation and predetermined encoding such as interleaving to the recording data DW, thereby generating write-intended modulation data DWT.

The modulation data DWT generated is stored into the buffer memory 12 by a predetermined amount. Each time a predetermined amount of data is stored, it is read at predetermined timing and supplied to the head drive unit 9. The head drive unit 9 subjects the modulation data DWT to power amplification and the like. The resultant is supplied to the magnetic head 4 as the writing data DWT' which is given power amplification etc., thereby producing a recording field for data write. Consequently, even in data write, the modulation data DWT is temporarily stored into the buffer memory 12 in units of predetermined amounts and read therefrom for the sake of adjustment between the timing for the signal processing unit 11 to perform encoding and the timing to write data to the magneto-optical disc 2.

The selector switches SWA1, SWA2, SWB1, SWB2, SWC1, and SWC2 are made of analog switches or the like which change over according to the instruction from the system controller 13.

The selector switch SWB1 has an input contact b11 and two output contacts b12 and b13. The input contact b11 is connected to an output terminal of the signal processing unit 11. The output contacts b12 and b13 are connected to the input terminals of the data expansion decoders 16 and 17, respectively.

The selector switch SWB1, when supplied with the demodulation data DR from the signal processing unit 11, transfers it to the data expansion decoder 16 via the input contact b11 and the output contact b12 or transfers it to the data expansion decoder 17 via the input contact b11 and the output contact b13 according to the instruction from the system controller 13.

The selector switch SWA2 has an output contact a21 and two input contacts a22 and a23. The output contact a21 is connected to an input terminal of the signal processing unit 11. The input contacts a22 and a23 are connected to the output terminals of the data compression encoders 14 and 15, respectively. The selector switch SWA2 changes over to connect either one of the input contacts a22 and a23 to the output contact a21 according to the instruction from the system controller 13.

When the output contact a21 and the input contact a22 are connected to each other according to the instruction from the system controller 13, compressed data supplied from the data compression encoder 14 is transferred to the signal processing unit 11 as the recording data DW. When the output contact a21 and the input contact a23 are connected, compressed data supplied from the data compression encoder 15 is transferred to the signal processing unit 11 as the recording data DW.

The selector switch SWB2 has input contacts b22 and b23 and an output contact b21. The input contacts b22 and b23 are connected to the output terminals of the data expansion decoders 16 and 17, respectively. The output contact b21 is connected to the input terminal of the D/A converter 19. The selector switch SWB2 changes over to connect either one of the input contacts b22 and b23 to the output contact b21 according to the instruction from the system controller 13.

The selector switch SWC1 is interposed between the input terminal of the data compression encoder 15 and the output terminal of the data expansion decoder 16. It switches between ON (conducting) and OFF (nonconducting) according to the instruction from the system controller 13.

The selector switch SWC2 is interposed between the input terminal of the data compression encoder 14 and the output terminal of the data expansion decoder 17. It switches between ON (conducting) and OFF (nonconducting) according to the instruction from the system controller 13.

In the present embodiment, these selector switches SWA1, SWA2, SWB1, SWB2, SWC1, and SWC2 are made of analog switches. Nevertheless, they may be composed of mechanical switches, or switching circuits which can change data transmission paths or interrupt data transmission such as a multiplexer and a demultiplexer.

The data compression encoder 14 compresses uncompressed data input from the selector switch SWA1 or SWC2 by using the ATRAC (Adaptive Transform Acoustic Coding) compression scheme. The data compressed is output to the selector switch SWA2.

More specifically, in the ATRAC compression scheme, the uncompressed data is subjected to a discrete cosine transform (DCT) for conversion from the time domain to the frequency domain. The resultant is subjected to predetermined band division, followed by predetermined encoding processes suited to the respective bands, to reduce the volume of information for data compression. As a result, a compression rate of approximately one-fifth shall be attained.

Here, this data compression encoder 14 is configured to process linear pulse code modulation (PCM) data as the uncompressed data mentioned above.

The data compression encoder 15 compresses uncompressed data input from the selector switch SWA1 or SWC1 by using the ATRAC3 compression scheme. The data compressed is output to the selector switch SWA2.

Incidentally, the ATRAC3 compression scheme is an extension of the ATRAC compression scheme. The ATRAC3 allows selection between "ATRAC3-LP2", a double length mode for a compression rate approximately twice that of the ATRAC compression scheme, and "ATRAC3-LP4", a quadruple length mode for a compression rate approximately four times that of the ATRAC compression scheme.

This data compression encoder 15 is also configured to process linear PCM data as the uncompressed data mentioned above.

The data expansion decoder 16, when demodulation data DR compressed under the ATRAC compression scheme is supplied thereto from the signal processing unit 11 through the selector switch SWB1, decodes the demodulation data DR in conformity to the ATRAC compression scheme and outputs the result of the decoding, or linear PCM data DPCM1.

The data expansion decoder 17, when demodulation data DR compressed under the ATRAC3 compression scheme is supplied thereto from the signal processing unit 11 through the selector switch SWB1, decodes the demodulation data DR in conformity to the ATRAC3 compression scheme and outputs the result of the decoding, or linear PCM data DPCM2.

The A/D converter 18, when an analog audio signal is supplied to its input terminal IN from an external audio apparatus, digitizes the analog audio signal into linear PCM data DWS based on a predetermined sampling frequency and outputs it to the selector switch SWA1.

The D/A converter 19, when the linear PCM data DPCM1 or DPCM2 mentioned above is supplied thereto as input data DRE in accordance with the connection of the selector switch SWB2, converts the input data DRE into an analog audio signal in the audio-frequency band and outputs the same to its output terminal OUT.

Incidentally, in the present embodiment, the A/D converter 18 and the D/A converter 19 are provided to implement analog input and analog output from/to so-called external equipment. Nevertheless, a digital input unit (not shown) and a digital output unit (not shown) may be provided instead so that digital audio data supplied from the external equipment is input to the selector switch SWA1 as the data DWS directly and the digital audio data DRE from the selector switch SWB2 is output as is to the external equipment or the like.

The system controller 13 includes a microprocessor (MPU) for executing predetermined system programs. The microprocessor exercises centralized control on the operation of this recordable MD player. The system programs are previously stored in a read only memory (ROM) arranged in the microprocessor.

The system controller 13 is connected with an operating unit 20 and a display unit 21. The operating unit 20 has a plurality of control keys (not shown). The display unit 21 is a liquid crystal display or the like.

The display unit 21 provides various displays including the internal state of this recordable MD player and operating instructions to users on the basis of display-intended data supplied from the system controller 13.

When any control key on the operating unit 20 is operated, the system controller 13 controls the operation of the entire recordable MD player so as to perform the processing designated by the control key.

Now, the operation of this recordable MD player having such configuration will be described with reference to the flowchart shown in FIG. 2.

Figure 2:
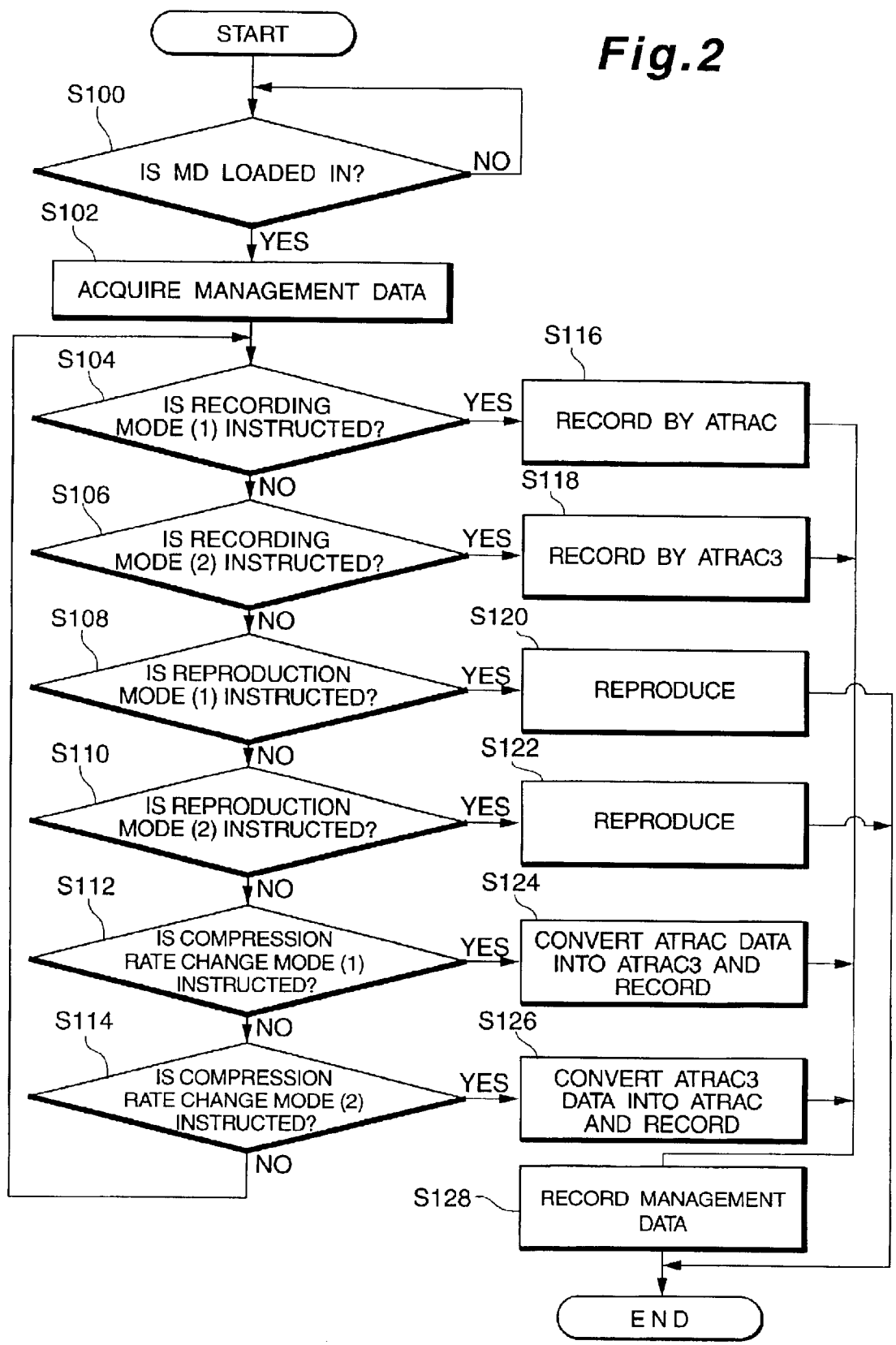
FIG. 2 is a flowchart for explaining the operation of the information recording/reproducing apparatus of the present embodiment.

In FIG. 2, it is determined if an MD is loaded in this recordable MD player by users (step S100). If any MD is loaded in, go to step S102.

At step S102, UTOC data which is recorded on the read-in area of the magneto-optical disc 2 is reproduced.

More specifically, the system controller 13 commands the servo controller 7 to activate the spindle motor 3 and make the carriage 6 move the optical pickup 5 toward the read-in area of the magneto-optical disc 2.

Then, the system controller 13 commands the laser output control unit 8 so that the magneto-optical disc 2 is irradiated with the laser beam intended for data read from the optical pickup 5. The direction of polarization of the beam reflected from the recording surface is detected to start reading the UTOC data, and the RF amplifier unit 10 and the signal processing unit 11 perform decoding (demodulation processing).

Acquiring the UTOC data reproduced thus, the controller 13 enters the processing of steps S104 and below.

At steps S104 through S114, a user instruction is determined by detecting which control key out of those arranged on the operating unit 20 is pressed.

If a "recording mode (1)", a facility of this recordable MD player, is instructed, that determination is made at step S104. Then, go to step S166 for recording.

If a "recording mode (2)" is instructed, that determination is made at step S106. Go to step S118 for recording.

If a "reproduction mode (1)" is instructed, that determination is made at step S108. Go to step S120 for reproduction.

If a "reproduction mode (2)" is instructed, that determination is made at step S110. Go to step S122 for reproduction.

If a "compression rate change mode (1)" is instructed, that determination is made at step S112. Go to step S124 for data conversion.

If a "compression rate change mode (2)" is instructed, that determination is made at step S114. Go to step S126 for data conversion.

Now, if the "recording mode (1)" is instructed from a predetermined control key, data recording is performed at step S116 based on the ATRAC compression scheme.

More specifically, audio signals supplied from the external equipment connected to the input terminal IN are compressed in conformity to the ATRAC compression scheme and recorded on the loaded MD.

In the "recording mode (1)", as shown in FIG. 3, the selector switches SWB1 and SWB2 both are turned OFF (in an open state where none of their contacts is connected). The selector switches SWC1 and SWC2 are also turned OFF. Meanwhile, the selector switch SWA1 is connected between the input contact a11 and the output contact a12. The selector switch SWA2 is connected between the input contact a22 and the output contact a21.

As a result, the linear PCM data DWS supplied through the A/D converter 18 is compressed under the ATRAC compression scheme by the data compression encoder 14. The recording data DW resulting from the data compression is then modulated by the signal processing unit 11, supplied to the head drive unit 9, and recorded on the magneto-optical disc 2.

When the data recording is completed, go to step S128. The UTOC data, or the management data generated by the signal processing unit 11 under the instruction from the system controller 13, is supplied to the head drive unit 9 as the modulation data DWT. Consequently, the UTOC data is recorded on the read-in area of the magneto-optical disc 2, and then the processing in the recording mode (1) is ended.

If the "recording mode (2)" is instructed at step S106 and the processing enters step S118 for recording, data recording is performed based on the ATRAC3 compression scheme.

More specifically, audio signals supplied from the external equipment connected to the input terminal IN are compressed in conformity to the ATRAC3 compression scheme and recorded on the loaded MD.

In the "recording mode (2)", as shown in FIG. 3, the selector switches SWB1 and SWB2 both are turned OFF (in an open state where none of their contacts is connected). The selector switches SWC1 and SWC2 are also turned OFF. Meanwhile, the selector switch SWA1 is connected between the input contact a11 and the output contact a13. The selector switch SWA2 is connected between the input contact a23 and the output contact a21.

As a result, the linear PCM data DWS supplied through the A/D converter 18 is compressed under the ATRAC3 compression scheme by the data compression encoder 15. The recording data DW resulting from the data compression is then modulated by the signal processing unit 11, supplied to the head drive unit 9, and recorded on the magneto-optical disc 2.

Incidentally, at step S118, if predetermined control keys arranged on the operating unit 20 are operated by users to select either of the foregoing double length mode "ATRAC3-LP2" and quadruple length mode "ATRAC3-LP4", the data compression encoder 15 performs data compression at the compression rate selected.

When the data recording is completed, go to step S128. The UTOC data, or the management data generated by the signal processing unit 11 under the instruction from the system controller 13, is supplied to the head drive unit 9 as the modulation data DWT. Consequently, the UTOC data is recorded on the read-in area of the magneto-optical disc 2, and then the processing in the recording mode (2) is ended.

If the "reproduction mode (1)" is instructed at step S108 and the processing enters step S120 for reproducing, the data recorded on the magneto-optical disc 2 is reproduced.

In the "reproduction mode (1)", the system controller 13 automatically detects the data compression scheme of the data recorded on the magneto-optical disc 2, and turns the selector switches SWB1 and SWB2 according to the data compression scheme detected.

More specifically, the system controller 13 determines which scheme the data is compressed under, the ATRAC compression scheme or the ATRAC3 compression scheme, from the management data and subcode data. The management data, showing the data compression scheme, is contained in the UTOC data acquired from the read-in area previously. The subcode data is obtained through separation and extraction when the signal processing unit 11 performs decoding.

In reproducing data which is compressed under the ATRAC compression scheme, the selector switch SWB1 is connected between the input contact b11 and the output contact b12. The selector switch SWB2 is connected between the input contact b22 and the output contact b21. The other select switches SWA1, SWA2, SWC1, and SWC2 are turned OFF.

In reproducing data which is compressed under the ATRAC3 compression scheme, the selector switch SWB1 is connected between the input contact b11 and the output contact b13. The selector switch SWB2 is connected between the input contact b23 and the output contact b21. The other select switches SWA1, SWA2, SWC1, and SWC2 are turned OFF.

In this way, the system controller 13 controls the selector switches SWA1, SWA2, SWB1, SWB2, SWC1, and SWC2 automatically, so that the data compressed under the ATRAC compression scheme or the ATRAC3 compression scheme is decoded by the data expansion decoder 16 or 17 and output through the D/A converter 19.

In addition, even if a plurality of types of data compressed under the ATRAC compression scheme and the ATRAC3 compression scheme are recorded on the magneto-optical disc 2, they are appropriately decoded by the foregoing control of the system controller 13 and output through the D/A converter 19.

When the reproducing of step S120 is completed, the processing in the reproduction mode (1) is ended.

If the "reproduction mode (2)" is instructed at step S110 and the processing enters step S122 for reproducing, the data recorded on the magneto-optical disc 2 is reproduced.

In instructing this "reproduction mode (2)", users or others can operate predetermined control keys arranged on the operating unit 20 to make selection between the data of the ATRAC compression scheme and the data of the ATRAC3 compression scheme recorded on the magneto-optical disc 2.

If the users or others instruct to reproduce the data of the ATRAC compression scheme, the system controller 13, in response to the instruction, connects the selector switch SWB1 between the input contact b11 and the output contact b12 and connects the selector switch SWB2 between the output contact b22 and the input contact b21. The selector switches SWA1, SWA2, SWC1, and SWC2 are turned OFF.

The system controller 13 then makes the optical pickup 5 access the recording surface of the magneto-optical disc 2 so as to read the pieces of data recorded on the magneto-optical disc 2 under the ATRAC compression scheme alone. The demodulation data DR demodulated by the signal processing unit 11 is decoded into non-compressed linear PCM data by the data expansion decoder 16 and output through the D/A converter 19.

If the users or others instruct to reproduce the data of the ATRAC3 compression scheme, the system controller 13, in response to the instruction, connects the selector switch SWB1 between the input contact b11 and the output contact b13 and connects the selector switch SWB2 between the output contact b23 and the input contact b21. The selector switches SWA1, SWA2, SWC1, and SWC2 are turned OFF.

The system controller 13 then makes the optical pickup 5 access the recording surface of the magneto-optical disc 2 so as to read the pieces of data recorded on the magneto-optical disc 2 under the ATRAC3 compression scheme alone. The demodulation data DR demodulated by the signal processing unit 11 is decoded into non-compressed linear PCM data by the data expansion decoder 17 and output through the D/A converter 19.

When the reproduction of step S122 is completed, the processing is ended.

If the "compression rate change mode (1)" is instructed at step S112 and the processing enters step S124, the data which is recorded on the magneto-optical disc 2 under the ATRAC compression scheme is converted into that of the ATRAC3 compression scheme and recorded on the magneto-optical disc 2 again.

More specifically, in the "compression rate change mode (1)", as shown in FIG. 3, the selector switches SWA1, SWB2, and SWC2 are turned OFF under the instruction from the system controller 13. The selector switch SWB1 is connected between the input contact b11 and the output contact b12. The selector switch SWA2 is connected between the output contact a21 and the input contact a23. In addition, the selector switch SWC1 is turned ON.

Figure 4:
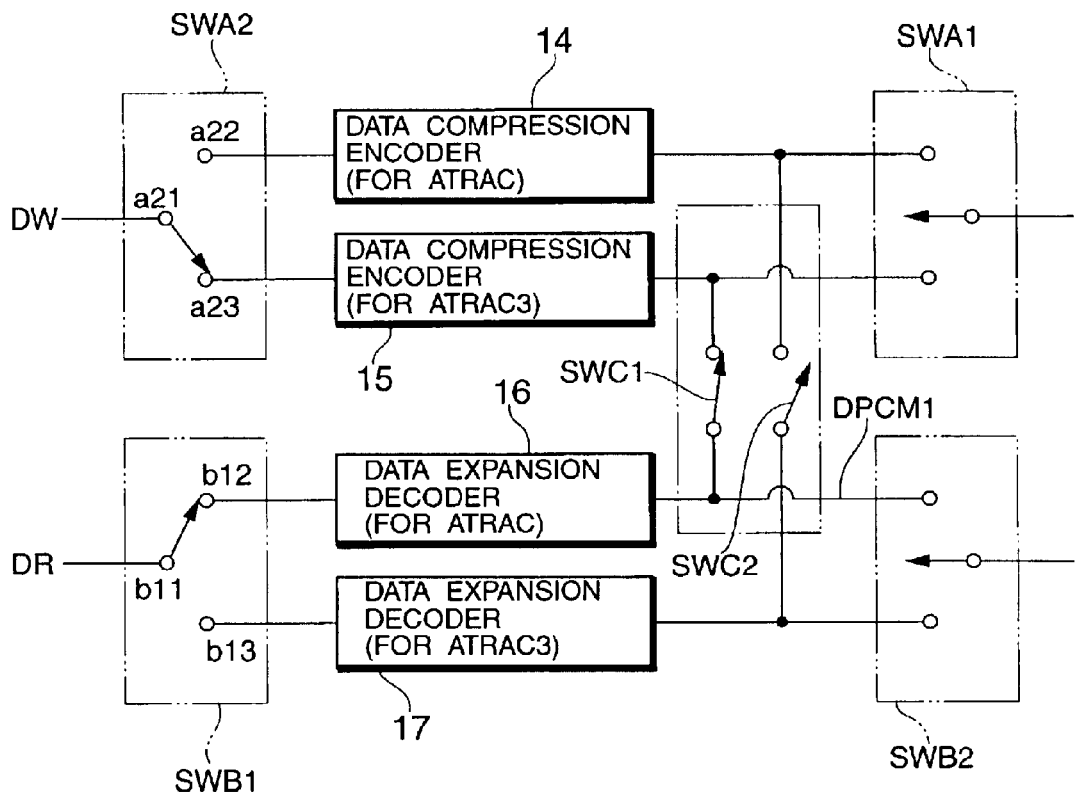
FIG. 4 is a diagram showing the connections among the selector switches, the data compression encoders, and the data expansion decoders in a compression rate change mode (1)

Consequently, as shown in FIG. 4, the output terminal of the signal processing unit 11 which outputs the demodulation data DR is connected to the data expansion decoder 16 through the selector switch SWB1. The output terminal of the data expansion decoder 16 and the input terminal of the data compression encoder 15 are connected through the selector switch SWC1. The output terminal of the data compression encoder 15 is connected through the selector switch SWA2 to the input terminal of the signal processing unit 11 which inputs the recording data DW.

Now, when a control key on the operating unit 20 for starting reproducing and recording operations, called "sync button", is operated by the users, the processing in the compression rate change mode (1) is started.

Again, at this step S124, if predetermined control keys arranged on the operating unit 20 are operated by the users to select either of the foregoing double length mode "ATRAC3-LP2" and quadruple length mode "ATRAC3-LP4", the data compression encoder 15 performs data compression at the compression rate selected.

The system controller 13 initially checks the UTOC data acquired already for the data compression scheme(s) of the data recorded on the magneto-optical disc 2, the track number(s) of the data, and the sector addresses at which the data is recorded.

For example, when the magneto-optical disc 2 contains one or more pieces of music, the UTOC data is checked for the data compression scheme of each piece, the track number(s) indicating the recording order of the piece(s), and the sector addresses indicating the area where each piece is stored.

The system controller 13 then moves the optical pickup 5 to the top of the sector addresses at which data is recorded under the ATRAC compression scheme. The data of the ATRAC compression scheme is read in order of the sector addresses, and demodulation data DR is generated by the signal processing unit 11.

The demodulation data DR is decoded into linear PCM data DPCM1 by the data expansion decoder 16. The linear PCM data DPCM1 is compressed by the data compression encoder 15 under the ATRAC3 compression scheme. The recording data DW resulting from the data compression under the ATRAC3 compression scheme is modulated by the signal processing unit 11. The resulting modulation data DWT is stored into the buffer memory 12 by a predetermined amount.

Moreover, the system controller 13 manages the modulation data DWT stored in the buffer memory 12 in association with the track numbers acquired from the UTOC data, and manages the amounts of the individual pieces of data corresponding to the respective track numbers of the modulation data DWT.

The data of the ATRAC compression scheme to be changed in compression rate is thus converted to the ATRAC3 compression scheme and the resulting modulation data DWT is stored into the buffer memory 12 by the predetermined amount before the mode is switched for data write. The predetermined amount of modulation data DWT stored in the buffer memory 12 is successively read from the top and supplied to the head drive unit 9, whereby it is written on the magneto-optical disc 2 through the magnetic head 4.

That is, if all the data of the ATRAC compression scheme to be changed in compression rate were converted to the ATRAC3 compression scheme and temporarily stored into the buffer memory 12, the buffer memory 12 would require a greater capacity. For this reason, the data is divided into predetermined amounts, converted to the ATRAC3 compression scheme, temporarily stored into the buffer memory 12, and read and recorded on the magneto-optical disc 2 in numbers.

Here, the system controller 13 writes the modulation data DWT to the magneto-optical disc 2 while it exercises access control over the magneto-optical disc 2 based on the UTOC data acquired previously so as to satisfy all the three requirements as follows:

(Requirement 1) The data of the ATRAC3 compression scheme recorded previously be left as is, being excluded from data read, data conversion, and data write;

(Requirement 2) The data converted from the ATRAC compression scheme to the ATRAC3 compression scheme be written successively and closely over from the top of the sector addresses where the data of the ATRAC compression scheme was recorded; and (Requirement 3) The data of the ATRAC3 compression scheme recorded previously, or the data of the ATRAC3 compression scheme excluded above, should not be overwritten.

After the modulation data DWT compressed under the ATRAC3 compression scheme is recorded according to these requirements 1–3, go to step S128. Here, the system controller 13 commands the signal processing unit 11 to generate management data which contains the track numbers, the sector addresses, and the data compression schemes of the respective pieces of data to be newly recorded on the magneto-optical disc 2. The management data is supplied to the head drive unit 9 as the modulation data DWT so that the UTOC data is written into the read-in area. This completes the processing in the compression rate change mode (1).

As a result of the processing in this compression rate change mode (1), as shown in concrete examples of FIGS. 6(a), 7(a), 8(a), 9(a), 10(a), and 11(a), the data converted to the ATRAC3 compression scheme is recorded on the magneto-optical disc 2 which is accommodated in the original MD. Incidentally, FIGS. 6(a), 7(a), 8(a), 9(a), 10(a), and 11(a) illustrate the cases where the foregoing double length mode "ATRAC3-LP2" is selected.

Figure 6:
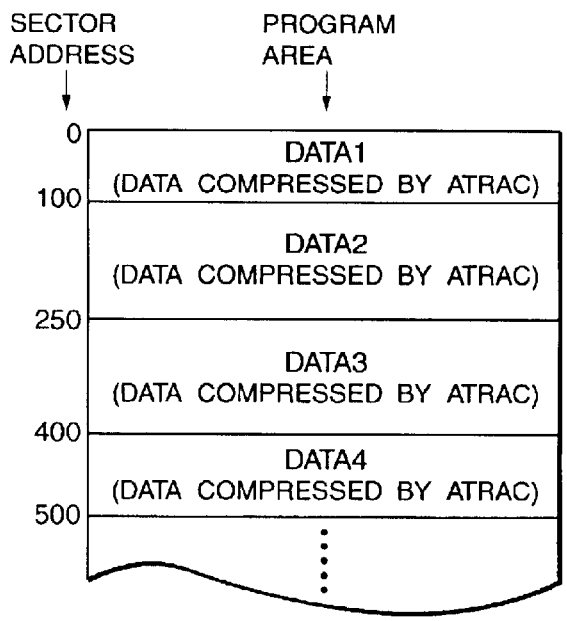
FIGS. 6(a) and 6(b) are diagrams illustrating a recording mode of data recorded on an MD in the compression rate change mode (1)
Figure 6:
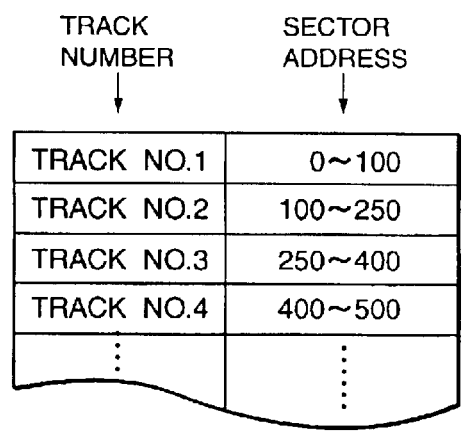

Suppose, as illustrated in FIG. 6(a), that the original magneto-optical disc 2 contains pieces of data DATA1, DATA2, DATA3, DATA4 . . . , all of which are compressed under the ATRAC compression scheme. As shown in FIG. 6(b), the data for showing the sector addresses shall be managed by the UTOC data in association with the track numbers [Track No. 1], [Track No. 2], [Track No. 3], [Track No. 4] . . . of the respective pieces of data DATA1, DATA2, DATA3, DATA4 . . . .

Figure 7:
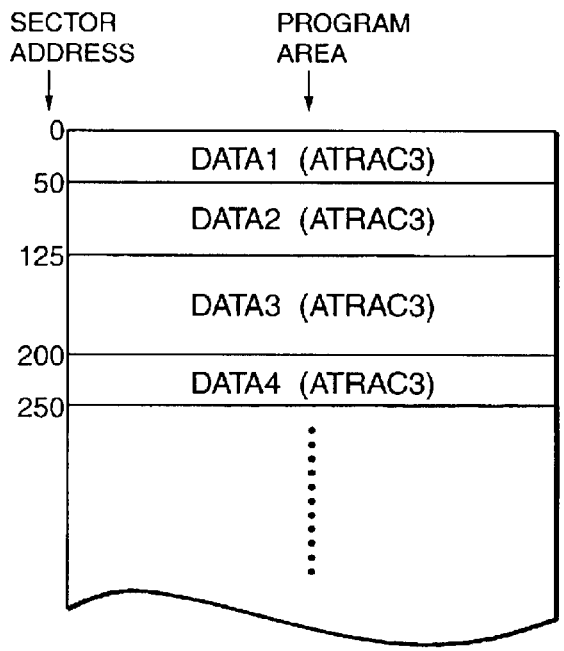
FIGS. 7(a) and 7(b) are diagrams illustrating the recording mode for situations where the data shown in FIG. 6(a) is compressed under a different data compression scheme and recorded on the MD in the compression rate change mode (1)
Figure 7:
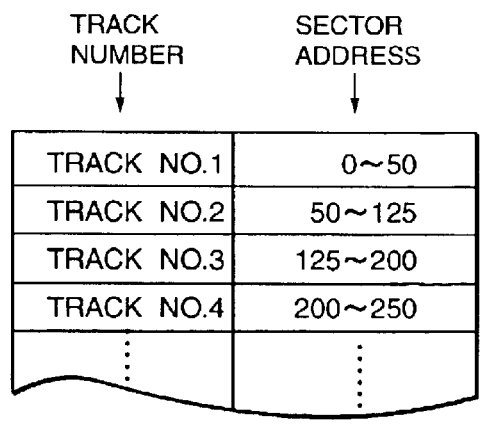

Here, the processing in the compression rate change mode (1) yields the result as shown in FIG. 7(a). That is, the pieces of data DATA1, DATA2, DATA3, DATA4 . . . converted to the ATRAC3 compression scheme are recorded closely on the program area of the magneto-optical disc 2. Moreover, as shown in FIG. 7(*b*), the UTOC data updated is recorded on the read-in area of the magneto-optical disc 2. The data for showing the sector addresses is managed by the updated UTOC data in association with the track numbers [Track No. 1], [Track No. 2], [Track No. 3], [Track No. 4] . . . of the respective pieces of data DATA1, DATA2, DATA3, DATA4, . . . converted.

Figure 8:
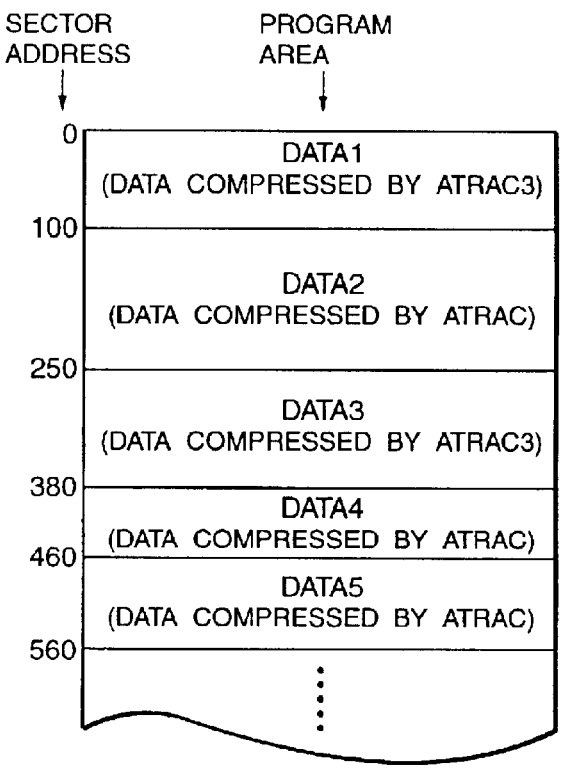
FIGS. 8(a) and 8(b) are diagrams illustrating another recording mode of data recorded on an MD in the compression rate change mode (1)
Figure 8:
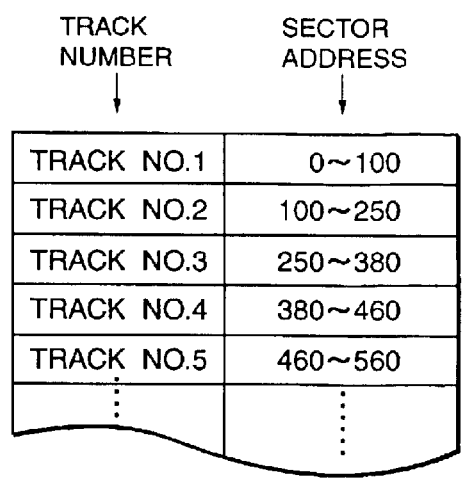

Suppose, as shown in FIG. 8(*a*), that the original magneto-optical disc 2 contains a mixture of data compressed under the ATRAC compression scheme and the ATRAC3 compression scheme. Specifically, pieces of data DATA1 and DATA3 are of the ATRAC3 compression scheme, and pieces of data DATA2, DATA4, and DATA5 the ATRAC compression scheme. As shown in FIG. 8(*b*), the data for showing the sector addresses shall be managed by the UTOC data in association with the track numbers [Track No. 1], [Track No. 2], [Track No. 3], [Track No. 4], [Track No. 5] . . . of the respective pieces of data DATA1, DATA2, DATA3, DATA4, DATA5 . . . .

Figure 9:
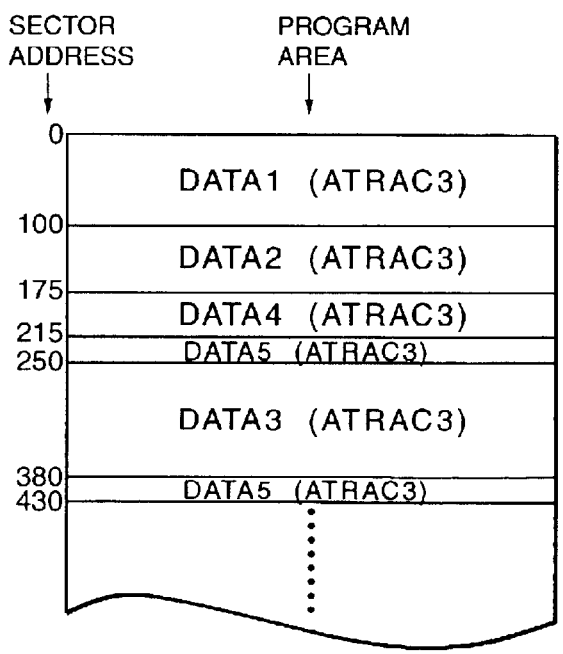
FIGS. 9(a) and 9(b) are diagrams illustrating the recording mode for situations where the data shown in FIG. 8(a) is compressed under a different data compression scheme and recorded on the MD.
Figure 9:
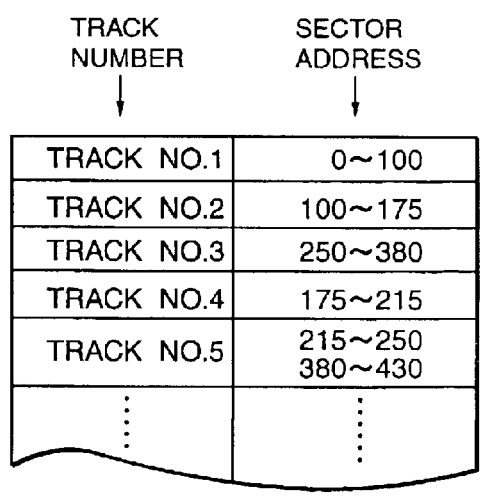

When such a mixture of data of the ATRAC compression scheme and the ATRAC3 compression scheme is recorded, the processing in the compression rate change mode (1) yields the result as shown in FIG. 9(*a*). That is, in the program area of the magneto-optical disc 2, DATA1 and DATA3, which are the pieces of data of the ATRAC3 compression scheme in the first place, are left intact in the same sector addresses. Meanwhile, DATA2, DATA4, DATA5 . . . , or the pieces of data newly converted to the ATRAC3 compression scheme, are recorded closely.

Since the pieces of data newly converted to the ATRAC3 compression scheme are recorded closely, ones which cannot be stored continuously, such as the data DATA5 newly converted to the ATRAC3 compression scheme, are divided and recorded in discrete sector addresses.

Then, as shown in FIG. 9(*b*), the UTOC data updated is recorded on the read-in area of the magneto-optical disc 2. The data for showing the sector addresses is managed by the updated UTOC data in association with the track numbers [Track No. 1], [Track No. 2], [Track No. 3], [Track No. 4], [Track No. 5] . . . of the respective pieces of data DATA1, DATA2, DATA3, DATA4, DATA5 . . . converted.

Now, suppose, as shown in FIG. 10(*a*), that the original magneto-optical disc 2 contains a mixture of data compressed under the ATRAC compression scheme and the ATRAC3 compression scheme, and the pieces of data corresponding to the track numbers [Track No. 1], [Track No. 2], [Track No. 3], [Track No. 4], [Track No. 5] . . . are stored in parts each. More specifically, as shown by the UTOC data of FIG. 10(*b*), the data of the track number [Track No. 1] is randomly stored as DATA1*a* and DATA1*b*, the data of the track number [Track No. 2] as DATA2*a* and DATA2*b*, the data of the track number [Track No. 3] as DATA3*a* and DATA3*b*, the data of the track number [Track No. 4] as DATA4*a* and DATA4*b*, and the data of the track number [Track No. 5] as DATA5*a* and DATA5*b*. In this case, the processing in the compression rate change mode (1) yields the result as shown in FIG. 11(*a*), or that the separate pieces of data are individually converted to the ATRAC3 compression scheme and stored closely. Note that the pieces of data which are of the ATRAC3 compression scheme in the first place are left intact in the same sector addresses.

Then, as shown in FIG. 11(*b*), the UTOC data updated is recorded on the read-in area of the magneto-optical disc 2. The data for showing the sector addresses is managed by the updated UTOC data in association with the track numbers [Track No. 1], [Track No. 2], [Track No. 3], [Track No. 4], [Track No. 5] . . . of the respective pieces of data DATA1, DATA2, DATA3, DATA4, DATA5 . . . converted.

As described above, when the processing in the compression rate change mode (1) is performed, the data converted to the ATRAC3 compression scheme is stored into the original MD and managed by the updated UTOC data as illustrated in FIGS. 7(*b*), 9(*b*), and 11(*b*). This can provide excellent convenience to the users.

In particular, the track numbers given to the yet-to-be-converted original data are inherited as is. Since the intact track numbers are given to the converted data and managed by the updated UTOC data, the users can treat the converted data with the same feeling as with the data yet to be converted. Consequently, it is possible to provide excellent convenience to the users without a sense of incompatibility.

Now, there is also provided a facility to avoid trouble in the event that this recordable MD player suffers such trouble as a main-power shutdown during the processing in the compression rate change mode (1).

This trouble avoiding facility will be described with reference to the flowcharts of FIGS. 12 and 13 and the explanatory diagrams of FIGS. 14(*a*), 14(*b*), 15(*a*), 15(*b*), 16(*a*), 16(*b*), 17(*a*) and 17(*b*).

Figure 12:
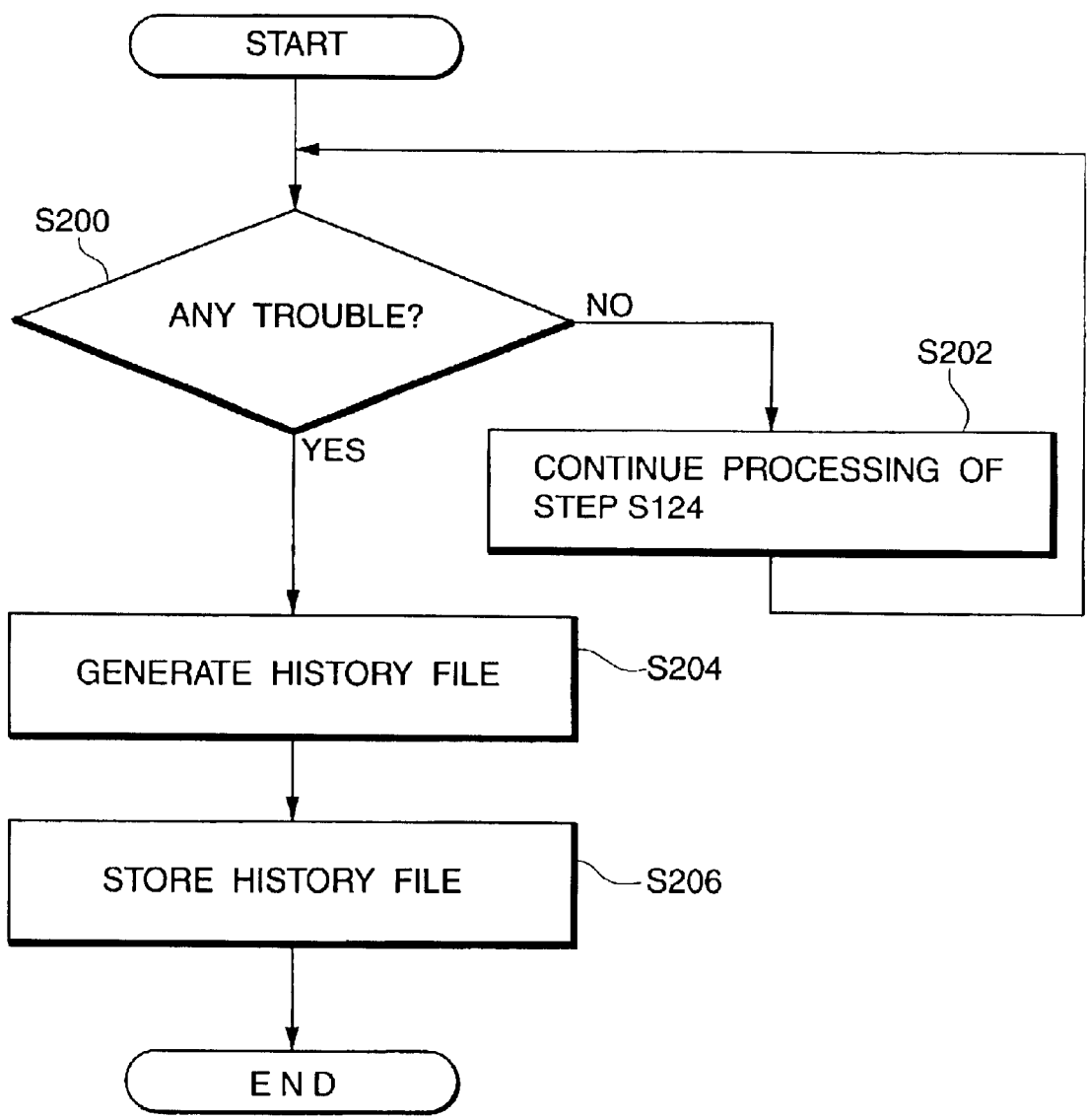
FIG. 12 is a flowchart showing the operation of a trouble avoiding facility.
Figure 13:
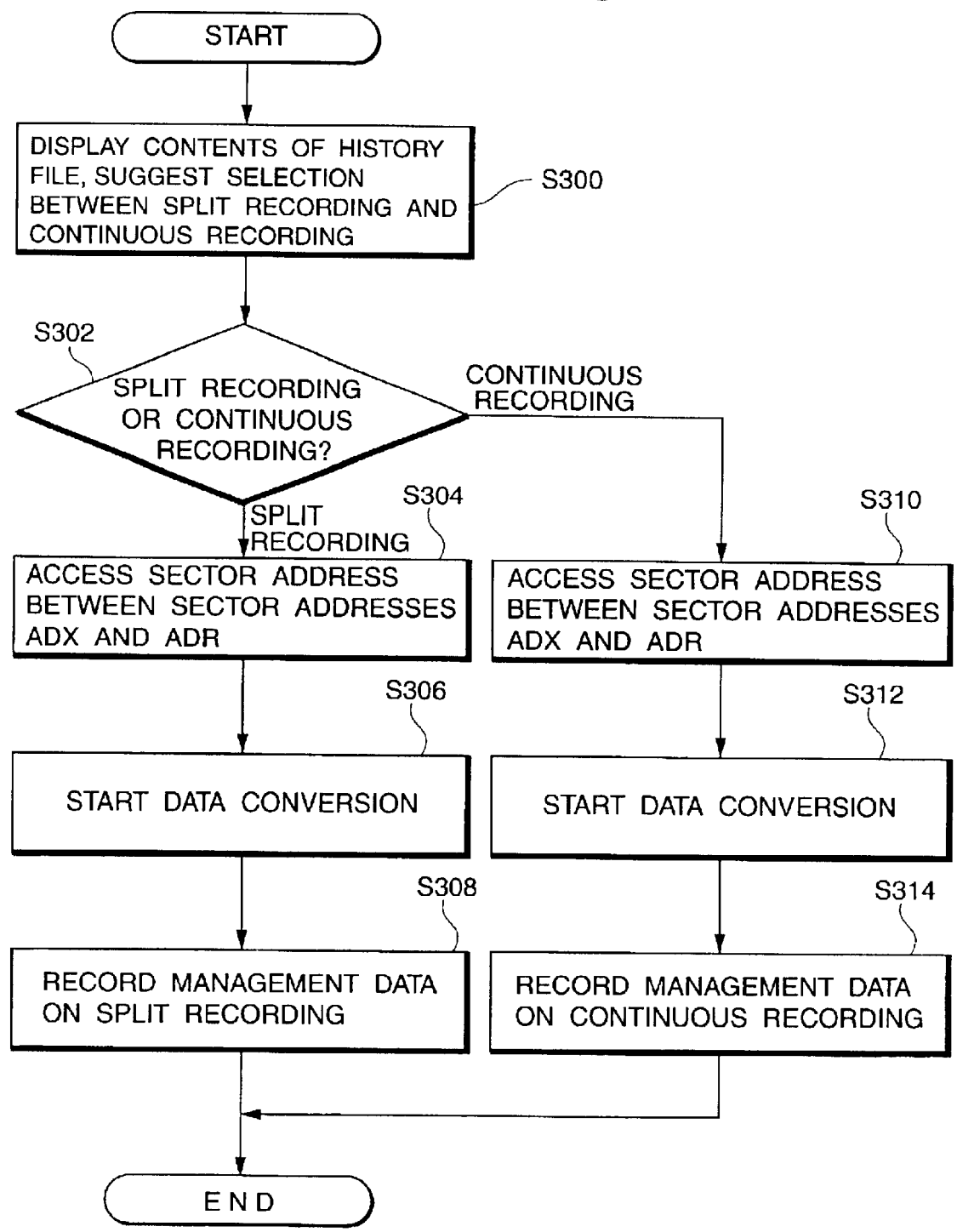
FIG. 13 is a flowchart further showing the operation of the trouble avoiding facility.

The processing of the trouble avoiding facility shown in the flowcharts of FIGS. 12 and 13 shall be executed by the system controller 13 in parallel with the execution of the processing of step S124 described previously in FIG. 2.

At step S200 in FIG. 12, whether such trouble as descried above occurs or not is determined successively during the processing of the step S124 in FIG. 2. In the absence of trouble, enter the processing of step S202 to continue the processing of step S124 in FIG. 2. If any trouble is determined to occur, discontinue the processing of step S124 in FIG. 2 having been executed so far and enter the processing of step S204.

At step S204, a sector address ADR for showing the final position ever completed of data conversion by the processing of step S124 in FIG. 2, the corresponding track number, and a sector address ADX for showing the final position already written are detected. These items of data are made into a history file.

Figure 14:
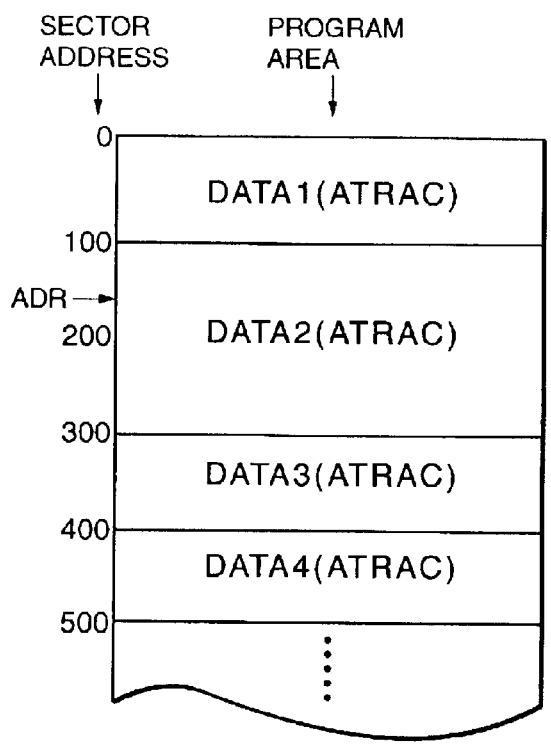
FIGS. 14(a) and 14(b) are diagrams for explaining the processing when trouble occurs during the operation shown in FIG. 12.
Figure 14:
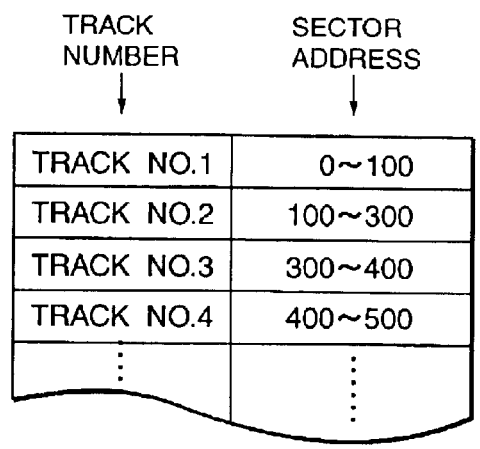

Take, for example, the case where the original magneto-optical disc 2 contains such pieces of data DATA1, DATA2, DATA3, DATA4 . . . as shown in FIG. 14(*a*) and such UTOC data as shown in FIG. 14(*b*). Here, suppose that trouble occurs during the data conversion of the data DATA2 corresponding to the track number [Track No. 2] and the data processing is completed up to the sector address ADR.

Figure 15:
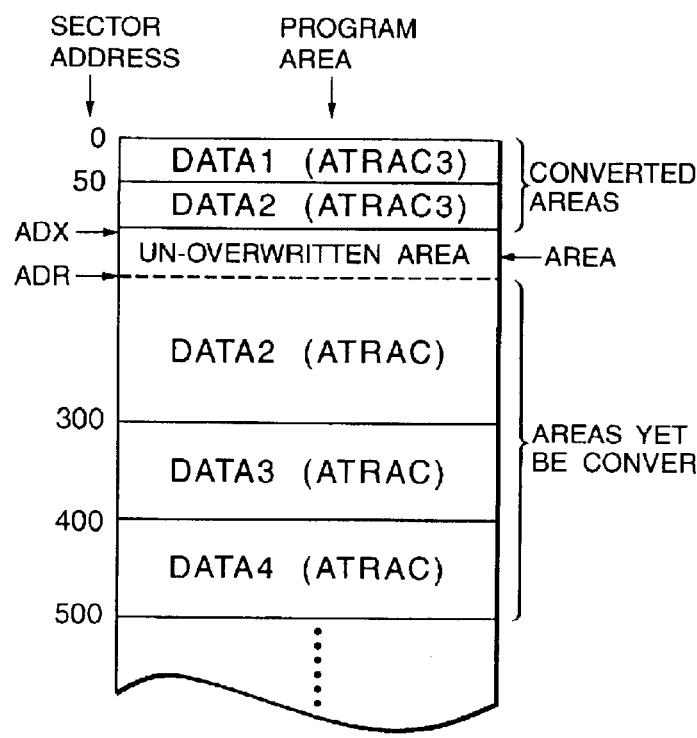
FIGS. 15(a) and 15(b) are diagrams for further explaining the processing in the event of trouble in the operation shown in FIG. 12.
Figure 15:
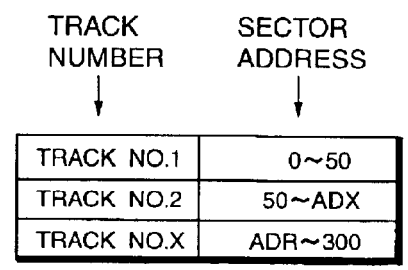

It follows that, as shown in FIG. 15(*a*), the data DATA2 converted to the ATRAC3 compression scheme is written into the program area of the magneto-optical disc 2 partway. More specifically, the data DATA2 in the range of sector addresses 100-ADR shown in FIG. 14(*a*) is converted to the ATRAC3 compression scheme and already written into the range of sector addresses "50-ADX" shown in FIG. 15(*a*).

Of the data DATA2, the portion which is converted to the ATRAC3 compression scheme and written already is exclusively associated with the original track number [Track No. 2]. As shown in FIG. 15(*b*), the track number [Track No. 2] is further associated with the sector addresses "50-ADX", and a history file is generated including data which shows the occurrence of trouble during the processing in the "compression rate change mode (1)".

In addition, the yet-to-be-converted data out of the data DATA2 shown in FIG. 14(*a*), or the sector addresses "ADR-300", is associated with a track number [Track No. X], which is then included into the history file. Incidentally, the track number [Track No. X] shall be the one subsequent to the final track number recorded on the original magneto-optical disc 2. For example, when the data having the track numbers [Track No. 1] to [Track No. 4] is stored, the track number [Track No. X] is set at [Track No. 5].

At step S206, the history file generated is stored into a nonvolatile memory (not shown) arranged in the system controller 13, thereby completing so-called backup processing.

Then, the foregoing trouble is disclosed. When activated again, this recordable MD player starts with the processing shown in FIG. 13.

Initially, at step S300, the contents of the history file are displayed on the display unit 21. A display is made to prompt user selection either to continue the processing of data conversion with the data of the yet-to-be-converted track number [Track No. X] and that of the converted track number as data of separate track numbers, or to continue the processing of data conversion with the data of the track number [Track No. X] and that of the converted track number as data of an identical track number.

Here, if the users operate the operating unit 20 to instruct "split recording", go to step S304. If "continuous recording" is instructed, go to step S310.

At step S304, the "compression rate change mode (1)" is set according to the history file. The optical pickup 5 is moved to a sector address between the sector addresses ADX and ADR as the sector address to start data read.

That is, in the event of trouble, as illustrated in FIG. 15(a), the final sector address at which data is last written is ADX. The area AREA between the sector addresses ADX and ADR is yet to be overwritten. Besides, the data DATA2 of the ATRAC3 compression scheme recorded in the sector addresses "50-ADX" is the data DATA2 recorded in the sector addresses "100-ADR" shown in FIG. 14(a), converted to the ATRAC3 compression scheme.

Consequently, the un-overwritten area AREA shown in FIG. 15(a) contains data which is already converted to the ATRAC3 compression scheme and recorded in the sector addresses "50-ADX", or equivalently, the data is yet to be overwritten and remains as is of the ATRAC compression scheme.

The optical pickup 5 is thus moved to a sector address between the sector addresses ADX and ADR so that the data conversion covers part of the data which remains as is of the ATRAC compression scheme. This ensures the continuity with the data which is converted to the ATRAC3 compression scheme and recorded in the sector addresses "50-ADX".

Next, at step S306, the data conversion under the ATRAC3 compression scheme is started. The data read from the un-overwritten area AREA is converted to the ATRAC3 compression scheme and merged with the data DATA2 (ATRAC3) of the track number [Track No. 2] for overwrite. This ensures the continuity with the foregoing data which is converted to the ATRAC3 compression scheme and recorded in the sector addresses "50-ADX".

Subsequently, data read is started from the sector address ADR. The data obtained from the sector addresses "ADR-300" is converted to the ATRAC3 compression scheme and written as data DATAX (ATRAC3) of the track number [Track No. X] in succession to the data DATA2 (ATRAC3) of the track number [Track No. 2].

The rest of the data recorded at and after the sector address 300 is similarly converted to the ATRAC3 compression scheme and written successively.

Figure 16:
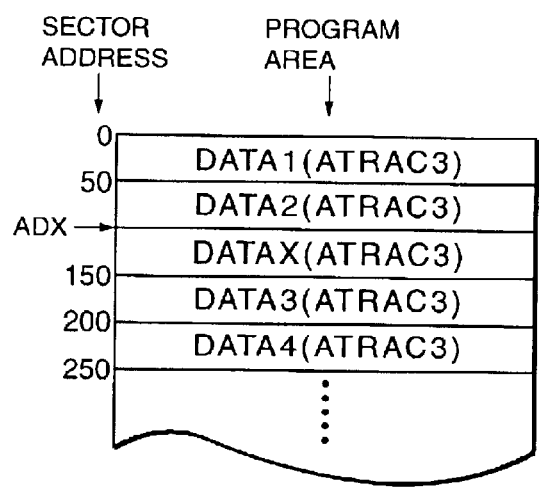
FIGS. 16(a) and 16(b) are diagrams for explaining the processing in the event of trouble in the operation shown in FIG. 13.
Figure 16:
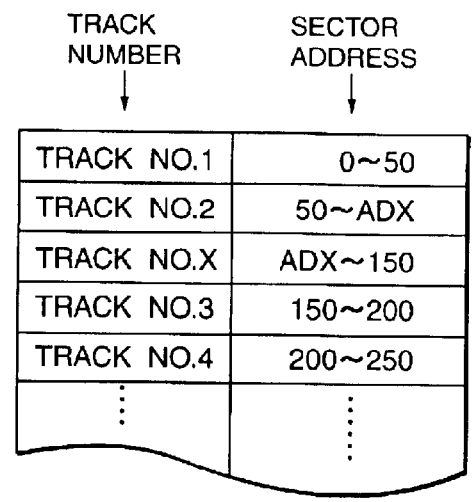

As a result of the processing of step S306, the pieces of data DATA1, DATA2, DATA3, DATA4 . . . originally recorded as shown in FIG. 14(a) are written as the pieces of data DATA1, DATA2, DATAX, DATA3, DATA4 . . . as illustrated in FIG. 16(a). The original data DATA2 which has encountered the trouble is written as the separate pieces of data DATA2 and DATAX.

Next, at step S308, UTOC data showing the track numbers [Track No. 1], [Track No. 2], [Track No. X], [Track No. 3], [Track No. 4] . . . and the sector addresses corresponding to the respective pieces of data DATA1, DATA2, DATAX, DATA3, DATA4 . . . shown in FIG. 16(a) is generated and recorded on the read-in area of the magneto-optical disc 2, thereby completing the processing.

On the other hand, if continuous recording is instructed at step S302 above, go to step S310. The same processing as in step S304 described above is performed at step S310, and then the processing of step S306 is performed at step S312.

Then, enter the processing of step S314 to generate UTOC data. The UTOC data is written into the read-in area of the magneto-optical disc 2, thereby completing the processing.

At step S314, however, the data of the track number [Track No. X] shown in FIG. 16(b) is managed as data continuous to that of the track number [Track No. 2].

More specifically, if the "split recording" is instructed, the data of the track number [Track No. 2] is recorded in the sector addresses "50-ADX" and the data of the track number [Track No. X] is recorded in the sector addresses "ADX-150". That is, these pieces of data are managed separately as shown in FIG. 16(b). In contrast, when the "continuous recording" is instructed, the data of the track number [Track No. X] is regarded as the same type of data continuous to that of the track number [Track No. 2]. The data of the track number [Track No. 2] is then managed as recorded in the sector addresses "50–150" as shown in FIG. 17(b).

Figure 17:
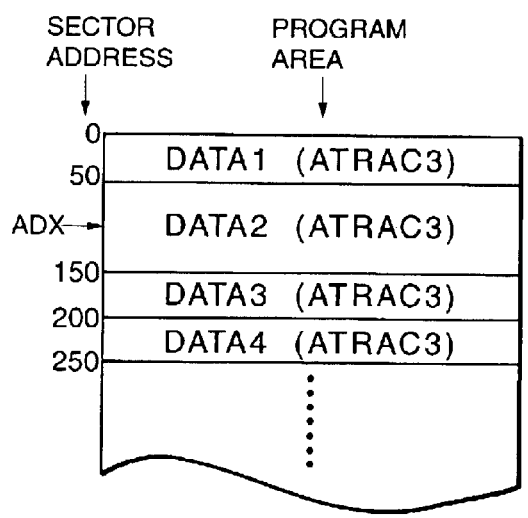
FIGS. 17(a) and 17(b) are diagrams for further explaining the processing in the event of trouble in the operation shown in FIG. 13.
Figure 17:
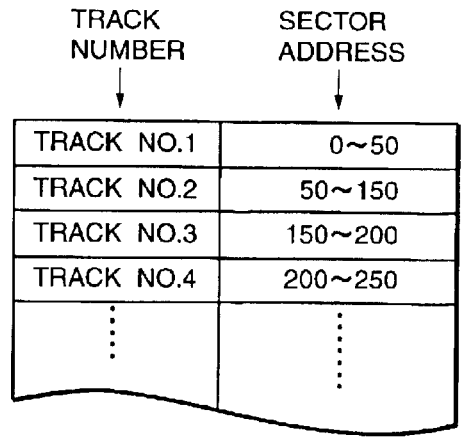

Consequently, as shown in FIG. 17(a), the data converted to the ATRAC3 compression scheme is stored as if it did not encounter any trouble.

Such provision of the trouble avoiding facility improves the reliability of the processing in the "compression rate change mode (1)". In addition, the presence of the alternatives "split recording" and "continuous recording" can broaden users' options for avoiding trouble.

Even when the data conversion is continued by the trouble avoiding facility, the track numbers given to the yet-to-be-converted original data are inherited as is. Since the intact track numbers are given to the converted data and managed by the updated UTOC data, the users can treat the converted data in the same feeling as with the data yet to be converted. Consequently, it is possible to provide excellent convenience to the users without a sense of incompatibility.

Returning to FIG. 2, when the "compression rate change mode (2)" is instructed at step S114 and the processing enters step S126, data which is recorded on the magneto-optical disc 2 under the ATRAC3 compression scheme is converted into that of the ATRAC compression scheme and recorded on the magneto-optical disc 2 again.

More specifically, in the "compression rate change mode (2)", as shown in FIG. 3, the selector switches SWA1, SWC1, and SWB2 are turned OFF under the instruction from the system controller 13. The selector switch SWA2 is connected between the input contact b22 and the output contact b21. The selector switch SWB1 is connected between the input contact b11 and the output contact b13.

Figure 5:
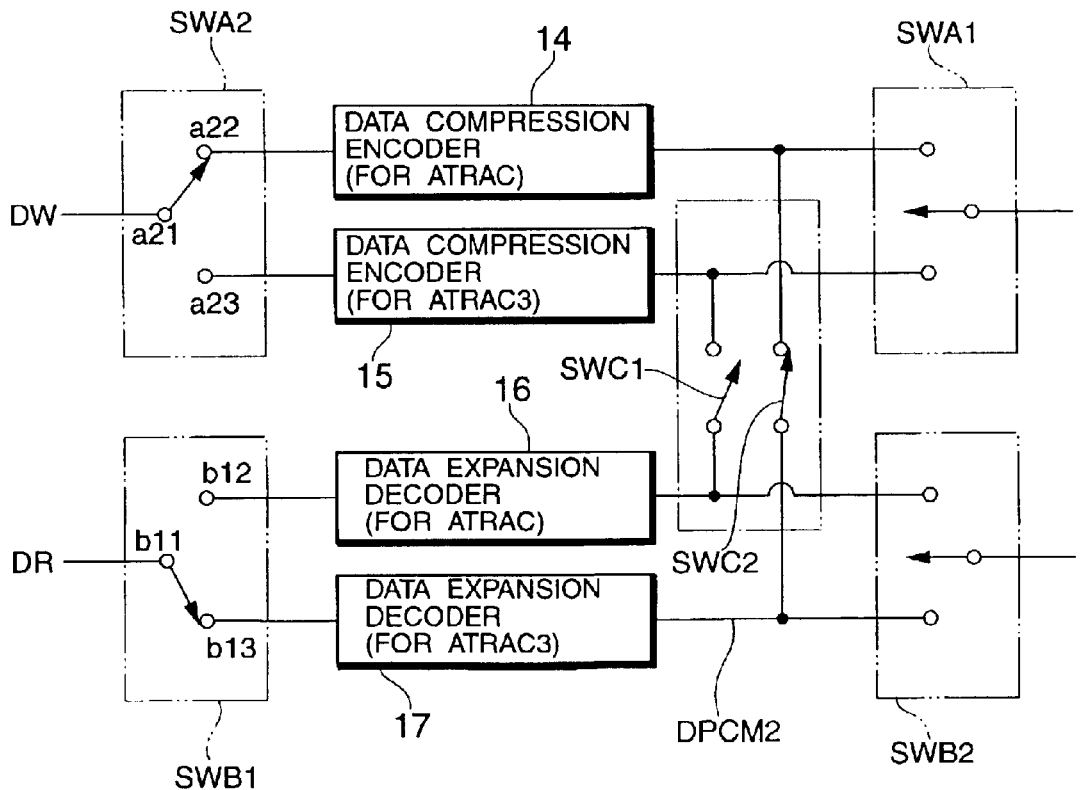
FIG. 5 is a diagram showing the connections among the selector switches, the data compression encoders, and the data expansion decoders in a compression rate change mode (2)

Consequently, as shown in FIG. 5, the output terminal of the signal processing unit 11 which outputs the demodulation data DR is connected to the data expansion decoder 17 through the selector switch SWB1. The output terminal of the data expansion decoder 17 and the input terminal of the data compression encoder 14 are connected through the selector switch SWC2. The output terminal of the data compression encoder 14 is connected through the selector switch SWA2 to the input terminal of the signal processing unit 11 which inputs the recording data DW.

Then, when the control key on the operating unit 20 for starting reproducing and recording operations, called "sync button", is operated by the users, the processing in the compression rate change mode (2) is started.

Incidentally, at this step S126, if the users operate predetermined control keys on the operating unit 20 to designate the double length mode "ATRAC3-LP2" mentioned above, data which is recorded in the double length mode of the ATRAC3 compression scheme is decoded by the data expansion decoder 17. If the quadruple length mode "ATRAC3-LP4" mentioned above is designated, data which is recorded in the quadruple length mode of the ATRAC3 compression scheme is decoded. If neither the double length mode "ATRAC3-LP2" nor the quadruple length mode "ATRAC3-LP4" is designated, the data which is recorded in the double length mode and the quadruple length mode of the ATRAC3 compression scheme is decoded according to the instruction from the system controller 13.

The system controller 13 initially checks the UTOC data acquired previously for the data compression scheme(s) of the data recorded on the magneto-optical disc 2, the track number(s) of the data, and the sector addresses at which the data is recorded.

For example, when the magneto-optical disc 2 contains one or more pieces of music, the UTOC data is checked for the data compression scheme of each piece, the track number(s) indicating the recording order of the piece(s), and the sector addresses indicating the area where each piece is stored.

Furthermore, it is determined if the magneto-optical disc 2, when the data already recorded on the magneto-optical disc 2 under the ATRAC3 compression scheme is converted into that of the ATRAC compression scheme for recording, can accommodate all the data converted to the ATRAC compression scheme. To be more specific, the ATRAC3 compression scheme is higher than the ATRAC compression scheme in compression rate. Consequently, when data of the ATRAC3 compression scheme is converted into that of the ATRAC compression scheme, the magneto-optical disc 2 may run short of recording capacity due to an increase in the amount of data. For this reason, the amount of the data already recorded under the ATRAC3 compression scheme is converted into the amount of data in the ATRAC compression scheme, and the amount of data converted is compared with the capacity of the available space on the magneto-optical disc 2. If the amount of data converted is smaller, the processing is continued without any alarm display. When the amount of data converted is greater, the display unit 21 makes an alarm display to prompt user instructions.

In response to the foregoing alarm display, if the users operate the operating unit 20 to instruct to continue the conversion, the system controller 13 continues the conversion, deciding that an instruction for forced continuation of the processing is given. That is, the data of the ATRAC3 compression scheme is converted into that of the ATRAC compression scheme and recorded on the magneto-optical disc 2 again as will be described later. If the magneto-optical disc 2 runs out of its available space during the re-recording, the data conversion and the re-recording will be terminated forcefully.

When such preprocessing is completed, the system controller 13 then moves the optical pickup 5 to the top of the sector addresses at which the data of the ATRAC3 compression scheme is recorded. The data of the ATRAC3 compression scheme is read in order of the sector addresses, and demodulation data DR is generated by the signal processing unit 11.

The demodulation data DR is decoded into linear PCM data DPCM2 by the data expansion decoder 17. The linear PCM data DPCM2 is compressed by the data compression encoder 14 under the ATRAC3 compression scheme. The recording data DW resulting from the data compression under the ATRAC compression scheme is modulated by the signal processing unit 11. The resulting modulation data DWT is stored into the buffer memory 12.

The system controller 13 also manages the modulation data DWT stored in the buffer memory 12 in association with the track numbers acquired from the UTOC data, and manages the amounts of the individual pieces of data corresponding to the respective track numbers of the modulation data DWT.

The data of the ATRAC3 compression scheme to be changed in compression rate is thus converted to the ATRAC compression scheme, and all the resulting modulation data DWT is stored into the buffer memory 12 up to the predetermined amount before the mode is switched for data write. All the modulation data DWT stored in the buffer memory 12 is successively read from the top and supplied to the head drive unit 9, whereby it is written on the magneto-optical disc 2 through the magnetic head 4.

Again, in this "compression rate change mode (2)", the buffer memory 12 would require a greater capacity if all the data of the ATRAC3 compression scheme to be changed in compression rate were converted to the ATRAC compression scheme and temporarily stored into the buffer memory 12. For this reason, the data is divided into predetermined amounts, converted to the ATRAC compression scheme, temporarily stored into the buffer memory 12, and read and recorded on the magneto-optical disc 2 in numbers.

Here, the system controller 13 writes the modulation data DWT to the magneto-optical disc 2 while it exercises access control over the magneto-optical disc 2 on the basis of the pre-acquired UTOC data so as to meet all the three requirements as follows:

(Requirement 4) The data of the ATRAC compression scheme recorded previously be left as is, being excluded from data read, data conversion, and data write;

(Requirement 5) The data converted from the ATRAC3 compression scheme to the ATRAC compression scheme be written successively and closely over from the top of the sector addresses where the data of the ATRAC3 compression scheme was recorded; and (Requirement 6) The data of the ATRAC compression scheme recorded previously, or the data of the ATRAC compression scheme excluded above, should not be overwritten.

After the modulation data DWT compressed under the ATRAC3 compression scheme is recorded according to these requirements 4–6, go to step S128. Here, the system controller 13 commands the signal processing unit 11 to generate the management data which contains the track numbers, the sector addresses, and the data compression schemes of the respective pieces of data to be newly recorded on the magneto-optical disc 2. The management data is supplied to the head drive unit 9 as the modulation data DWT so that the UTOC data is written into the read-in area, thereby completing the processing.

Figure 18:
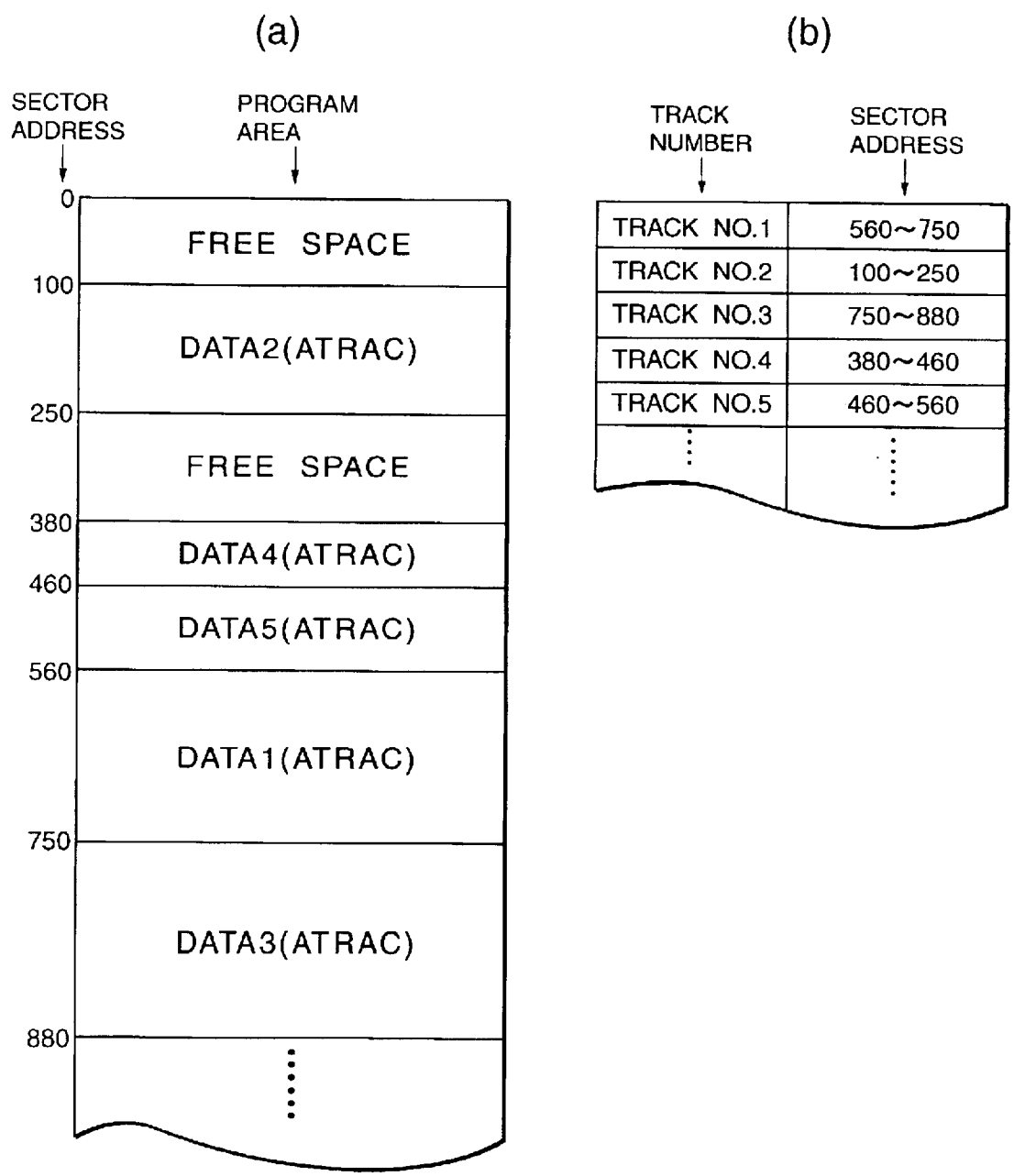
FIGS. 18(a) and 18(b) are diagrams illustrating a recording mode for situations where data is compressed by a different data compression scheme and recorded on the MD in the compression rate change mode (2).

As a result of the processing in this compression rate change mode (2), the data converted to the ATRAC3 compression scheme is recorded on the magneto-optical disc 2 accommodated in the original MD, as shown in a concrete example of FIG. 18(*a*). FIG. 18(*a*) illustrates the case where a mixture of data compressed under the ATRAC compression scheme and in the double length mode of the ATRAC3 compression mode is recorded on the MD as shown in FIG. 8(*a*), and the data of the ATRAC compression scheme is converted and rerecorded on the MD.

As shown in FIG. 18(*a*), when recording is performed while satisfying the foregoing three requirements (requirements 4–6), the pieces of data DATA2, DATA4, and DATA5 originally compressed under the ATRAC compression scheme are kept intact in the same sector addresses. The pieces of data DATA1 and DATA3 newly converted to the ATRAC compression scheme are recorded in succession to the last piece of data DATA5 originally compressed under the ATRAC compression scheme.

The track numbers given to the yet-to-be-converted original data are inherited as is. That is, the intact track numbers are given to the converted data and managed by the updated UTOC data. Hence, the users can have the converted data reproduced in the same order as with the yet-to-be-converted original data. Since the track numbers given to the yet-to-be-converted original data are not changed but thus associated with the converted data and applied as is, it is possible to provide excellent convenience to the users without a sense of incompatibility.

As has been described, according to the recordable MD player of the present embodiment, the pieces of data compressed by the different data compression schemes are converted mutually and recorded on the original MD for update. This allows the users to utilize the data recorded on the MD freely.

The track numbers given to the yet-to-be-converted original data are inherited as is. Since the intact track numbers are given to the converted data and managed by the updated UTOC data, the users can treat the converted data in the same feeling as with the data yet to be converted. This makes is possible to provide excellent convenience to the users without a sense of incompatibility.

In addition, the provision of the facility for avoiding trouble produces such effects as providing excellent convenience to the users.

Incidentally, the foregoing embodiment has dealt with a recordable MD player which uses an MD for information recording and information reproduction. Nevertheless, the information recording/reproducing apparatus of the present invention may also use information recording/reproducing media other than MDs, such as write-once CDs/DVDs and rewritable CDs/DVDs.

The foregoing embodiment has dealt with the case where data conversion is performed between data of the ATRAC compression scheme and that of the ATRAC3 compression scheme. However, the present invention may also be applied to information recording/reproducing apparatuses not using the ATRAC compression scheme and the ATRAC3 compression scheme if the data compression encoders 14, 15 and the data expansion decoders 16, 17 are composed of encoders and decoders conformable to data compression schemes other than the ATRAC compression scheme and the ATRAC3 compression scheme.

Moreover, the present invention is not limited to a change of the data compression scheme in the same type of information recording/reproducing medium but may be applied to a change of the data compression scheme between different types of information recording/reproducing media. Take, for example, an information recording/reproducing apparatus which comprises a hard disc (HD) drive for performing information recording and information reproduction on a HD and a recordable player for performing information recording and information reproduction on an MD, CD, DVD, or the like. Here, the present invention may be applied to a change of the data compression scheme between these different types of information recording/reproducing media.

As has been described above, according to the information recording/reproducing apparatus of the present invention, data which is compressed under a predetermined data compression scheme and recorded on an information recording/reproducing medium is compressed under a different data compression scheme and re-recorded on the information recording/reproducing medium. Consequently, this information recording/reproducing apparatus alone can convert data into that of a different data compression scheme and re-record the same on the original information recording/reproducing medium, thereby providing excellent convenience to users.

Management data for managing the data written after data conversion and that before the data conversion as the same type of data is recorded on the information recording/reproducing medium. The data written after the data conversion can thus be treated as the same type of data as that before the data conversion, with excellent convenience.

In the event of trouble, the data already written before the occurrence of the trouble and the data written after the resumption of data read both are properly converted and recorded on the information recording/reproducing medium. This allows the provision of excellent convenience.

The data written before the occurrence of the trouble and the data written after the resumption of the data read can be managed as separate pieces of data. This allows various modes of management corresponding to the occurrence of trouble.

In addition, the data written before the occurrence of the trouble and the data written after the resumption of the data read can be managed as the same type of data. This allows data management as if no trouble occurred.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An information recording/reproducing apparatus comprising:

reading means for reading data recorded on an information recording/reproducing medium, said data being compressed under a predetermined data compression scheme;

decoding means for decoding said data read by said reading means;

encoding means for compressing said data decoded by said decoding means under a data compression scheme other than said data compression scheme; and writing means for writing said data compressed by said encoding means on said information recording/reproducing medium.

2. The information recording/reproducing apparatus according to claim 1, further comprising:

control means for generating management data and making said writing means record said generated management data on said information recording/reproducing medium, said management data managing said data written by said writing means as a same type of data as said data read by said reading means.

3. The information recording/reproducing apparatus according to claim 2, wherein:

if trouble occurs while said writing means record said data compressed by said encoding means on said information recording/reproducing medium, said control means retain information on a final read position of said data already read by said reading means and information on a final write position of said data already written by said writing means; and when said trouble disappears, said control means make said reading means resume reading from data recorded between the final read position and the final write position, make said decoding means and said encoding means perform their processing, and make said writing means write data compressed after the resumption in succession to said data already written before the occurrence of said trouble.

4. The information recording/reproducing apparatus according to claim 3, wherein:

said control means generate management data and make said writing means record said generated management data on said information recording/reproducing medium, said management data managing said data written before the occurrence of said trouble and said data written after the resumption as separate pieces of data.

5. The information recording/reproducing apparatus according to claim 3, wherein:

said control means generate management data and make said writing means record said generated management data on said information recording/reproducing medium, said management data managing said data written before the occurrence of said trouble and said data written after the resumption as the same type of data.

6. An information recording/reproducing apparatus comprising:

a reading unit for reading data recorded on an information recording/reproducing medium, said data being compressed under a predetermined data compression scheme;

a decoder for decoding said data read by said reading unit;

an encoder for compressing said data decoded by said decoder under a data compression scheme other than said data compression scheme; and a writing unit for writing said data compressed by said encoder on said information recording/reproducing medium.

7. The information recording/reproducing apparatus according to claim 6, further comprising:

a controller for generating management data and making said writing unit record said generated management data on said information recording/reproducing medium, said management data managing said data written by said writing unit as a same type of data as said data read by said reading unit.

8. The information recording/reproducing apparatus according to claim 7, wherein:

if trouble occurs while said writing unit records said data compressed by said encoder on said information recording/reproducing medium, said controller retains information on a final read position of said data already read by said reading unit and information on a final write position of said data already written by said writing unit; and when said trouble disappears, said controller makes said reading unit resume reading from data recorded between the final read position and the final write position, makes said decoder and said encoder perform their processing, and makes said writing unit write data compressed after the resumption in succession to said data already written before the occurrence of said trouble.

9. The information recording/reproducing apparatus according to claim 8, wherein:

said controller generates management data and makes said writing unit record said generated management data on said information recording/reproducing medium, said management data managing said data written before the occurrence of said trouble and said data written after the resumption as separate pieces of data.

10. The information recording/reproducing apparatus according to claim 8, wherein:

said controller generates management data and makes said writing unit record said generated management data on said information recording/reproducing medium, said management data managing said data written before the occurrence of said trouble and said data written after the resumption as the same type of data.

* * * * *